Tappey, Lumsden, & Steel,
Hackling Shucks.
No. 108,207. Patented Oct. 11, 1870.
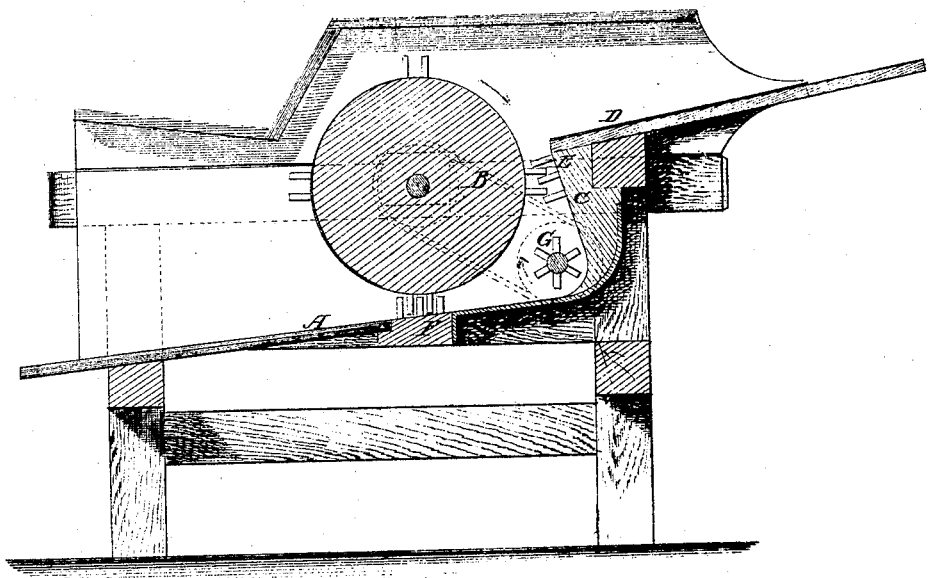
Witnesses:
Gustave Dieterich
L. S. Mabee
Inventor:
W. H. Tappey
W. C. Lumsden
A. Steel
PER
Attorneys.

United States Patent Office.

WILLIAM H. TAPPEY, WILLIAM C. LUMSDEN, AND ALEXANDER STEEL, OF PETERSBURG, VIRGINIA.

Letters Patent No. 108,207, dated October 11, 1870.

IMPROVEMENT IN SHUCK-HACKLING MACHINES.

The Schedule referred to in these Letters Patent and making part of the same.

*To all whom it may concern:*

Be it known that we, WILLIAM H. TAPPEY, WILLIAM C. LUMSDEN, and ALEXANDER STEEL, of Petersburg, in the county of Dinwiddie and State of Virginia, have invented a new and improved Shuck-Hackling Machine; and we do hereby declare that the following is a full, clear, and exact description thereof, which will enable others skilled in the art to make and use the same, reference being had to the accompanying drawing forming part of this specification.

This invention relates to improvements in machines for hackling corn-shuck and other like substances, and consists in an arrangement of one large toothed cylinder, having the teeth arranged in sections with spaces between, two concaves or fixed toothed parts of the case, and a revolving rake between the said concaves or fixed toothed parts of the case, all in a manner calculated to be more efficient in operation than the common arrangements of these machines with two toothed cylinders, all as hereinafter more fully specified.

The drawing represents a longitudinal sectional elevation of our improved machine.

A is the bed of the case, above which the large toothed cylinder B, having the teeth arranged in two or more longitudinal rows with broad spaces between, is arranged to revolve horizontally in the usual way.

This bed rises abruptly in front of the cylinder at C, above the center thereof, and to the feeding table D, at the upper part of this part C, and in front of the roller, it is provided with the teeth E, with which the teeth of the roller act in conjunction, and under the center of the roller it is provided with another set of teeth, F, between which toothed parts is a plane surface, in the angle of which we place a small revolving toothed rake, G, parallel with the roller, but far enough away from it to allow it to act on the shucks delivered upon it in a way to rake and adjust them, so as to change and present them to the next concave in new positions, so that they will be cut more finely than they would otherwise be.

We can accomplish good results with the cylinder B and the toothed concaves E F, without the revolving rake, and we propose, in some cases, to dispense with the said rollers.

Having thus described our invention,

We claim as new and desire to secure by Letters Patent—

In combination with the cylinder provided with longitudinal rows of teeth, the toothed concaves E and F, and revolving rake G, arranged substantially as herein shown and described.

WILLIAM H. TAPPEY.
WM. C. LUMSDEN.
ALEXR. STEEL.

Witnesses:
  R. G. GREENE,
  M. SEARLE.